(12) United States Patent
Shiraishi et al.

(10) Patent No.: US 8,794,220 B2
(45) Date of Patent: Aug. 5, 2014

(54) BLOW-BY GAS RECIRCULATING APPARATUS FOR AN ENGINE

(75) Inventors: Kentaro Shiraishi, Sakai (JP); Hiroshi Manabe, Sakai (JP); Yutaka Noyori, Sakai (JP)

(73) Assignee: KUBOTA Corporation, Osaka-shi, Osaka (JP)

( * ) Notice: Subject to any disclaimer, the term of this patent is extended or adjusted under 35 U.S.C. 154(b) by 794 days.

(21) Appl. No.: 12/876,506

(22) Filed: Sep. 7, 2010

(65) Prior Publication Data

US 2011/0073083 A1    Mar. 31, 2011

(30) Foreign Application Priority Data

Sep. 30, 2009   (JP) ................. 2009-227164
Jul. 20, 2010   (JP) ................. 2010-162698

(51) Int. Cl.
*F02B 25/06*    (2006.01)

(52) U.S. Cl.
USPC ......... 123/572; 123/573; 123/574; 123/41.86

(58) Field of Classification Search
USPC ...................... 123/572–574, 41.86
See application file for complete search history.

(56) References Cited

U.S. PATENT DOCUMENTS

| | | | | |
|---|---|---|---|---|
| 4,768,493 | A * | 9/1988 | Ohtaka et al. ................. | 123/573 |
| 6,425,451 | B2 * | 7/2002 | Yoshida et al. ............... | 180/219 |
| 6,644,290 | B2 * | 11/2003 | Yoneyama et al. ........... | 123/572 |
| 7,743,758 | B2 * | 6/2010 | Keyaki et al. ................. | 123/574 |
| 7,900,612 | B2 * | 3/2011 | Knaus et al. .................. | 123/574 |
| 2008/0041324 | A1 * | 2/2008 | Matsushima et al. ...... | 123/41.21 |
| 2008/0210206 | A1 * | 9/2008 | Kuji et al. .................... | 123/573 |
| 2009/0090337 | A1 * | 4/2009 | Asanuma et al. ............. | 123/574 |
| 2009/0308364 | A1 * | 12/2009 | Konohara ..................... | 123/572 |

FOREIGN PATENT DOCUMENTS

| | | |
|---|---|---|
| JP | S57-171109 U | 10/1982 |
| JP | H03-112507 U | 11/1991 |
| JP | H09-250325 A | 9/1997 |
| JP | 2002213226 A | 7/2002 |
| JP | 2008196366 A | 8/2008 |

OTHER PUBLICATIONS

Office Action mailed Aug. 14, 2013 in JP Application No. 2010-162698.

* cited by examiner

*Primary Examiner* — Marguerite McMahon
*Assistant Examiner* — James Kim
(74) *Attorney, Agent, or Firm* — Panitch Schwarze Belisario & Nadel LLP

(57) ABSTRACT

The invention provides a blow-by gas recirculating apparatus for a crankcase with enhanced ventilation efficiency. A fresh air introducing chamber is remote from a head cover. An upstream intake passage of a throttle valve is communicated with the fresh air introducing chamber, and the fresh air introducing chamber is communicated with a crankcase through a crankcase communication throttle hole which is opened in the crankcase. Fresh air in the upstream intake passage of the throttle valve is introduced into the crankcase sequentially through a fresh air introducing passage, the fresh air introducing chamber, and the throttle hole, without being short-circuited to a PCV valve. In a reverse flow from the crankcase to the upstream intake passage of the throttle valve, a gas in the crankcase reversely flows into the upstream intake passage sequentially through the throttle hole, the fresh air introducing chamber, and the fresh air introducing passage.

7 Claims, 12 Drawing Sheets

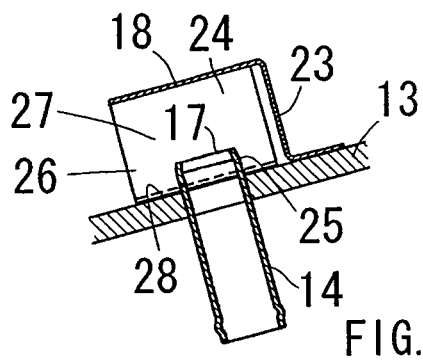
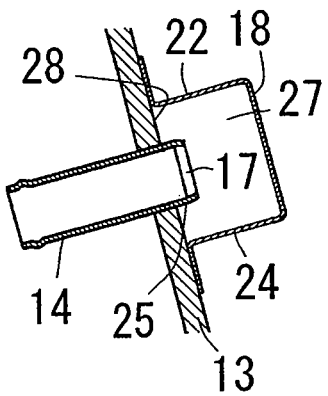
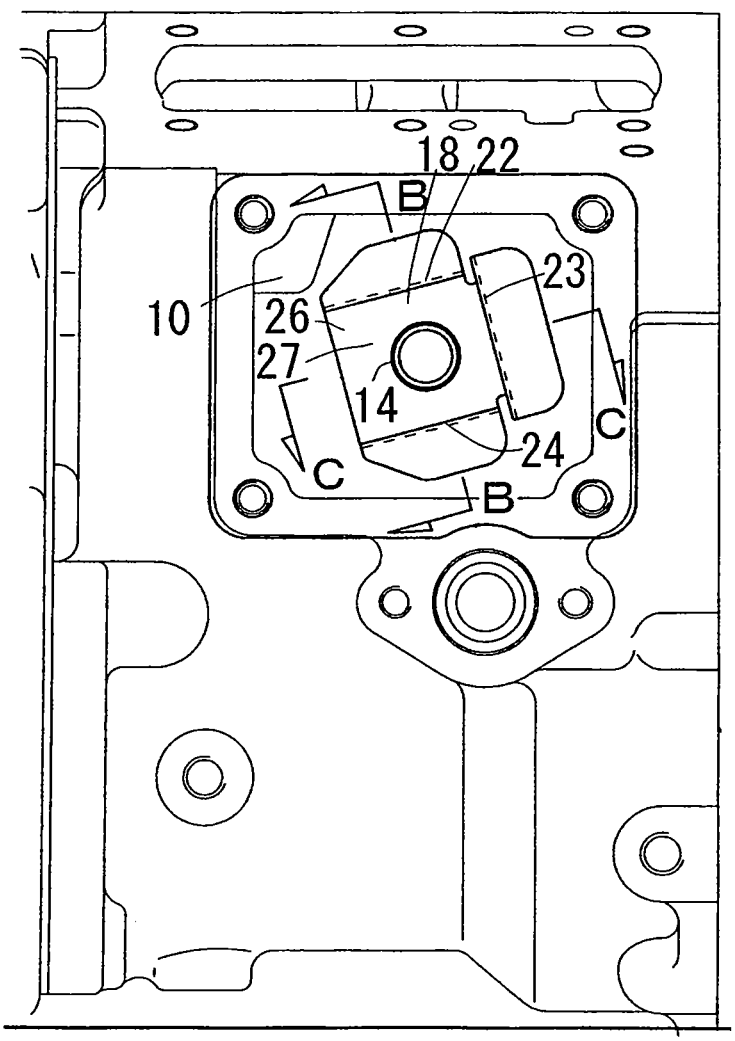
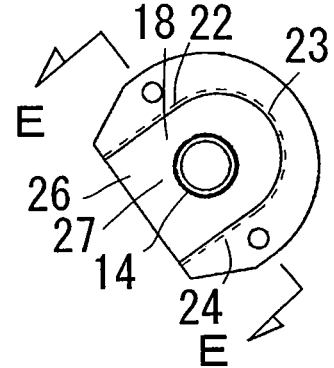
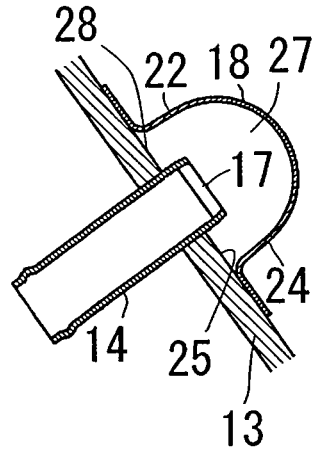

BLOW-BY GAS RECIRCULATING APPARATUS FOR AN ENGINE

TECHNICAL FIELD

The present invention relates to a blow-by gas recirculating apparatus for an engine, and more particularly to a blow-by gas recirculating apparatus for an engine in which the ventilation efficiency of a crankcase can be enhanced.

The term "PCV valve" in the specification and claims is an abbreviation for "Positive Crankcase Ventilation valve", and means a valve which adjusts the amount of a blow-by gas flown into an intake passage in accordance with the intake negative pressure of the intake passage.

BACKGROUND ART

Conventionally, a blow-by gas recirculating apparatus for an engine is known in which a PCV valve is attached to a head cover attached to a cylinder head, the PCV valve is communicated with a downstream intake passage of a throttle valve through a blow-by gas passage, and an upstream intake passage of the throttle valve is communicated with a crankcase through a fresh air introducing passage (see Patent Literature 1).

An apparatus of this kind has an advantage that the blow-by gas in the crankcase is recirculated to a combustion chamber by ventilation in the crankcase, and the blow-by gas is suppressed from entering engine oil collected in a lower portion of the crankcase to degrade the engine oil.

In this prior art, however, the fresh air introducing passage is communicated with the crankcase through the head cover, and hence there arises a problem.

PRIOR ART LITERATURE

Patent Literature

[Patent Literature 1] Japanese Patent Application Laid-Open No. 2002-213226 (see FIG. 3)

SUMMARY OF THE INVENTION

Problem to be Solved by the Invention

<Problem> The crankcase is sometimes insufficiently ventilated.

Since the fresh air introducing passage is communicated with the crankcase through the head cover, fresh air which is introduced from the fresh air introducing passage is short-circuited from the head cover to the PCV valve, and the crankcase is sometimes insufficiently ventilated.

It is an object of the invention to provide a blow-by gas recirculating apparatus for an engine in which the ventilation efficiency of a crankcase can be enhanced.

Means for Solving the Problem (Invention Set Forth in Claim 1)

The characteristic matter of the invention set forth in Claim 1 is as follows.

In a blow-by gas recirculating apparatus for an engine in which, as exemplified in FIGS. 1(A) and 1(B) or FIGS. 7(A) and 7(B), a PCV valve (3) is attached to a head cover (2) attached to a cylinder head (1), the PCV valve (3) is communicated with a downstream intake passage (6) of a throttle valve (5) through a blow-by gas passage (4), and an upstream intake passage (7) of the throttle valve (5) is communicated with a crankcase (9) through a fresh air introducing passage (8), as exemplified in FIGS. 1(A) and 1(B) or FIGS. 7(A) and 7(B), a fresh air introducing chamber (10) is disposed at a position which is remote from the head cover (2), the upstream intake passage (7) of the throttle valve (5) is communicated with the fresh air introducing chamber (10) through the fresh air introducing passage (8), and the fresh air introducing chamber (10) is communicated with the crankcase (9) through a crankcase communication throttle hole (11) which faces toward an interior of the crankcase (9), whereby fresh air (12) in the upstream intake passage (7) of the throttle valve (5) is introduced into the crankcase (9) sequentially through the fresh air introducing passage (8), the fresh air introducing chamber (10), and the crankcase communication throttle hole (11), without being short-circuited to the PCV valve (3), and, in a reverse flow from the crankcase (9) to the upstream intake passage (7) of the throttle valve (5), a gas in the crankcase (9) reversely flows into the upstream intake passage (7) of the throttle valve (5) sequentially through the crankcase communication throttle hole (11), the fresh air introducing chamber (10), and the fresh air introducing passage (8).

Effects of the Invention (Invention Set Forth in Claim 1)

The invention set forth in Claim 1 achieves the following effects.

<Effect> The ventilation efficiency of the crankcase can be enhanced.

As exemplified in FIGS. 1(A) and 1(B) or FIGS. 7(A) and 7(B), the fresh air (12) in the upstream intake passage (7) of the throttle valve (5) is introduced into the crankcase (9) sequentially through the fresh air introducing passage (8), the fresh air introducing chamber (10), and the crankcase communication throttle hole (11), without being short-circuited to the PCV valve (3). Therefore, the ventilation efficiency of the crankcase (9) can be enhanced.

<Effect> It is possible to suppress a takeout of oil mist into the intake passage in the reverse flow.

As exemplified in FIGS. 1(A) and 1(B) or FIGS. 7(A) and 7(B), in the reverse flow from the crankcase (9) to the upstream intake passage (7) of the throttle valve (5), the gas in the crankcase (9) reversely flows into the upstream intake passage (7) of the throttle valve (5) sequentially through the crankcase communication throttle hole (11), the fresh air introducing chamber (10), and the fresh air introducing passage (8). Therefore, the gas in the crankcase (9) which contains oil mist expands during a process in which the gas flows from the crankcase communication throttle hole (11) into the fresh air introducing chamber (10), and, because of the reduction of the flow rate, the oil mist condenses, so that oil is separated. In the reverse flow from the crankcase (9) to the upstream intake passage (7) of the throttle valve (5), consequently, a takeout of oil mist into the intake passage can be suppressed.

(Invention Set Forth in Claim 2)

The invention set forth in Claim 2 achieves the following effects in addition to the effects of the invention set forth in Claim 1.

<Effect> The function of suppressing the takeout of oil mist in the reverse flow is high.

As exemplified in FIGS. 2 to 4(B) or FIGS. 8 to 10(E), a fresh air introducing pipe (14) is attached to a fresh air introducing chamber wall (13), a passage end portion (16) of the fresh air introducing passage (8) is connected to a pipe inlet portion (15) of the fresh air introducing pipe (14), and a pipe outlet opposed wall (18) is disposed in front of a pipe outlet (17) of the fresh air introducing pipe (14). Therefore, oil mist in the fresh air introducing chamber (10) is blocked by the pipe outlet opposed wall (18), and hardly reaches the pipe outlet (17) of the fresh air introducing pipe (14). Consequently, the function of, in the reverse flow, suppressing the takeout of oil mist from the crankcase (9) to the upstream intake passage (7) of the throttle valve (5) is high.

(Invention Set Forth in Claim 3)

The invention set forth in Claim 3 achieves the following effect in addition to the effects of the invention set forth in Claim 2.

<Effect> The function of suppressing the takeout of oil mist in the reverse flow is high.

As exemplified in FIGS. 2 and 4(A) or FIGS. 8, 10(B), 10(C), and 10(E), a pipe outlet portion (25) of the fresh air introducing pipe (14) is projected into the fresh air introducing chamber (10) with respect to an inner wall face (28) of the fresh air introducing chamber wall (13). Therefore, the engine oil which flows over the inner wall face (28) of the fresh air introducing chamber wall (13) is blocked by the pipe outlet portion (25) of the fresh air introducing pipe (14), and does not enter the pipe outlet (17) of the fresh air introducing pipe (14). Consequently, the function of, in the reverse flow, suppressing the takeout of oil mist from the crankcase (9) to the upstream intake passage (7) of the throttle valve (5) is high.

(Invention Set Forth in Claim 4)

The invention set forth in Claim 4 achieves the following effects in addition to the effects of the invention set forth in Claim 1.

<Effect> The ventilation efficiency of the crankcase can be enhanced.

As exemplified in FIGS. 1(A) and 1(B), after passing through the fresh air introducing passage (8) and the fresh air introducing chamber (10), the fresh air (12) in the upstream intake passage (7) of the throttle valve (5) is introduced into the crankcase (9) sequentially through a transmission case communication throttle hole (32), a transmission case (31), and the crankcase communication throttle hole (11). Therefore, the ventilation efficiency of the crankcase (9) can be enhanced.

<Effect> It is possible to suppress a takeout of oil mist into the intake passage in the reverse flow.

As exemplified in FIGS. 1(A) and 1(B), in the reverse flow from the crankcase (9) to the upstream intake passage (7) of the throttle valve (5), the gas in the crankcase (9) passes through the crankcase communication throttle hole (11), and further sequentially through the transmission case (31) and the transmission case communication throttle hole (32), and then reversely flows into the upstream intake passage (7) of the throttle valve (5) sequentially through the fresh air introducing chamber (10) and the fresh air introducing passage (8). Therefore, the gas in the crankcase (9) which contains oil mist expands during each of processes in which the gas flows from the crankcase communication throttle hole (11) into the transmission case (31), and in which the gas flows from the transmission case communication throttle hole (32) into the fresh air introducing chamber (10), and, because of the reduction of the flow rate, the oil mist condenses, so that oil is separated. In the reverse flow from the crankcase (9) to the upstream intake passage (7) of the throttle valve (5), consequently, a takeout of oil mist into the intake passage can be suppressed.

(Invention Set Forth in Claim 5)

The invention set forth in Claim 5 achieves the following effects in addition to the effects of the invention set forth in Claim 2.

<Effect> The function of suppressing the takeout of oil mist in the reverse flow is high.

As exemplified in FIG. 4(A), the pipe outlet opposed wall (18) is placed below the pipe outlet (17) of the fresh air introducing pipe (14), and the pipe outlet opposed wall (18) is downward inclined toward a lower end edge (34) of the wall, thereby causing the engine oil which flows over the upper face of the pipe outlet opposed wall (18), to flow down from the lower end edge (34) of the pipe outlet opposed wall (18) to a lower portion of the fresh air introducing chamber (10). Therefore, the engine oil which condenses on an upper portion of the pipe outlet opposed wall (18) flows over the pipe outlet opposed wall (18), and is discharged from the lower end edge (34) of the wall. Consequently, the function of, in the reverse flow, suppressing the takeout of oil mist from the crankcase (9) to the upstream intake passage (7) of the throttle valve (5) is high.

(Invention Set Forth in Claim 6)

The invention set forth in Claim 6 achieves the following effect in addition to the effects of the invention set forth in Claim 2.

<Effect> The function of suppressing the takeout of oil mist in the reverse flow is high.

As exemplified in FIGS. 8 to 10(E), pipe outlet portion surrounding walls (22), (23), (24) are bendingly formed from a peripheral edge portion of the pipe outlet opposed wall (18) toward the fresh air introducing chamber wall (13) to which the fresh air introducing pipe (14) is attached, three peripheral sides of the pipe outlet portion (25) are surrounded respectively by the pipe outlet portion surrounding walls (22), (23), (24), a communication port (26) is disposed in a remaining one peripheral side, and a surrounded space (27) surrounded by the pipe outlet opposed wall (18) and the pipe outlet portion surrounding walls (22), (23), (24) is communicated with the fresh air introducing chamber (10) in an outer side through the communication port (26). Therefore, oil mist in the fresh air introducing chamber (10) is blocked by the pipe outlet portion surrounding walls (22), (23), (24), and hardly reaches the pipe outlet (17) of the fresh air introducing pipe (14). Consequently, the function of, in the reverse flow, suppressing the takeout of oil mist from the crankcase (9) to the upstream intake passage (7) of the throttle valve (5) is high.

(Invention Set Forth in Claim 7)

The invention set forth in Claim 7 achieves the following effect in addition to the effects of the invention set forth in Claim 6.

<Effect> The function of suppressing the takeout of oil mist in the reverse flow is high.

As exemplified in FIGS. 8 to 10 (A) and 10(D), the lower pipe outlet portion surrounding wall (24) is downward inclined toward the communication port (26), to cause the engine oil which flows over the upper face of the lower pipe outlet portion surrounding wall (24), to flow down from the communication port (26) to a lower portion of the fresh air introducing chamber (10). Therefore, the engine oil which condenses inside the pipe outlet portion surrounding walls (22), (23), (24) flows over the upper face of the lower pipe outlet portion surrounding wall (24), and is promptly discharged from the communication port (26). Consequently, the function of, in the reverse flow, suppressing the takeout of oil mist from the crankcase (9) to the upstream intake passage (7) of the throttle valve (5) is high.

(Invention Set Forth in Claim 8)

The invention set forth in Claim 8 achieves the following effect in addition to the effects of the invention set forth in Claim 1.

<Effect> The ventilation efficiency of the crankcase is high.

As exemplified in FIG. 7(A), the fresh air introducing chamber (10) is disposed in adjacent to the crankcase (9). Therefore, the fresh air introducing chamber (10) can be placed at a position which is sufficiently remote from the head cover (2). The short circuit of the fresh air (12) from the upstream intake passage (7) of the throttle valve (5) to the PCV valve (3) is surely prevented from occurring, and the ventilation efficiency of the crankcase (9) is high.

BRIEF DESCRIPTION OF THE DRAWINGS

FIG. 4(A) is a back view of a fresh air introducing chamber and its periphery, and FIG. 4(B) is a view looking in the direction of arrow B in FIG. 4(A).

FIGS. 10(A) to 10(E) are views illustrating the cylinder block of FIG. 8, FIG. 10(A) is a side view of a fresh air introducing chamber and its periphery, FIG. 10(B) is a sectional view taken along line B-B in FIG. 10(A), FIG. 10(C) is a sectional view taken along line C-C in FIG. 10(A), FIG. 10(D) is a side view of a modification of a pipe outlet opposed wall and pipe outlet portion surrounding walls, and FIG. 10(E) is a sectional view taken along line E-E in FIG. 10(D).

MODE FOR CARRYING OUT THE INVENTION

FIGS. 1 to 6 are views illustrating a blow-by gas recirculating apparatus for an engine of a first embodiment of the invention. In the embodiment, a vertical straight multi-cylinder gas engine will be described.

The extension direction of a crank shaft (not shown) is set to the anteroposterior direction, one side of the direction is set to the front side, and the other side is set to the rear side.

Figure 5:
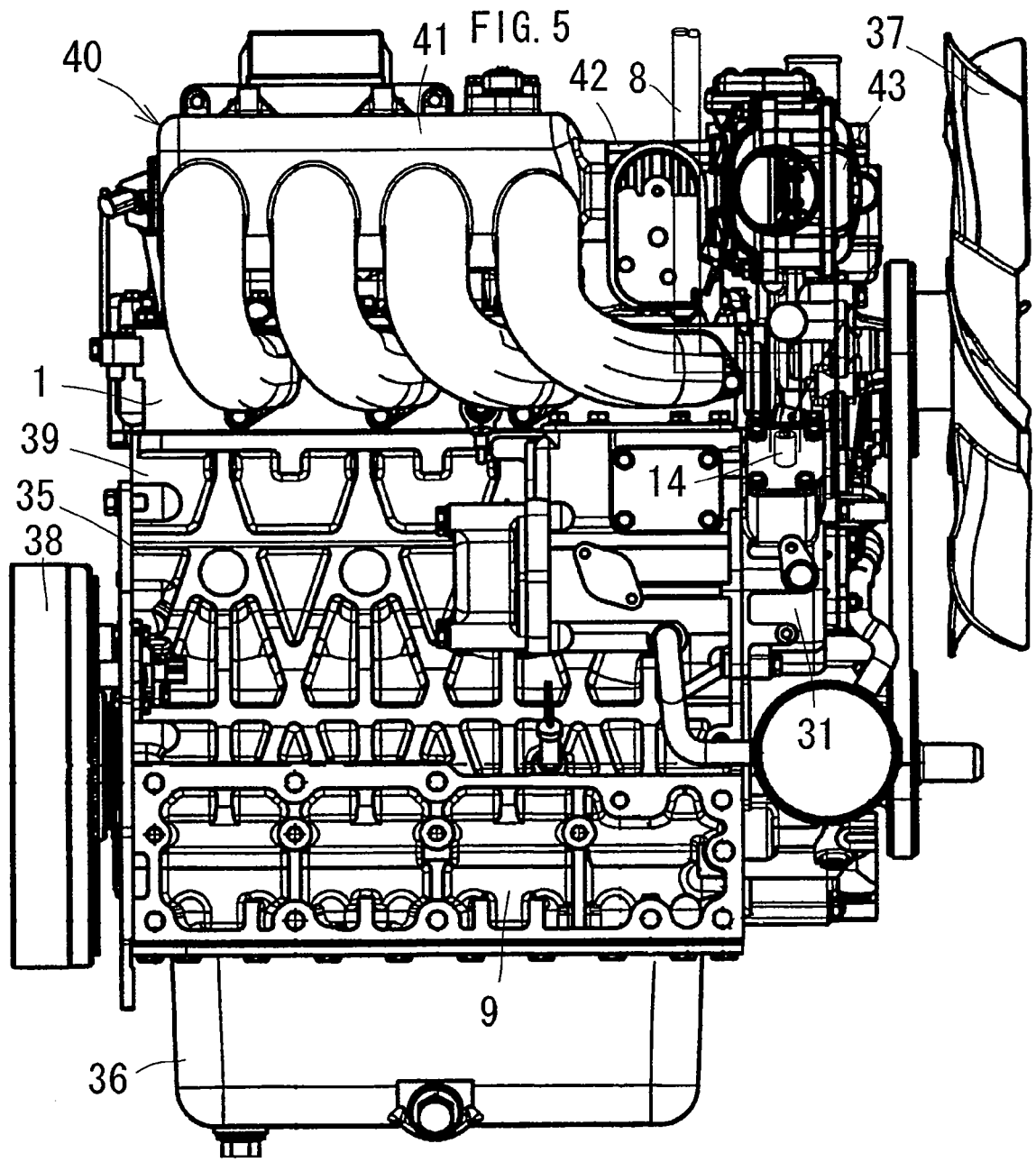
FIG. 5 is a side view of the engine including the blow-by gas recirculating apparatus of the first embodiment of the invention.
Figure 6:
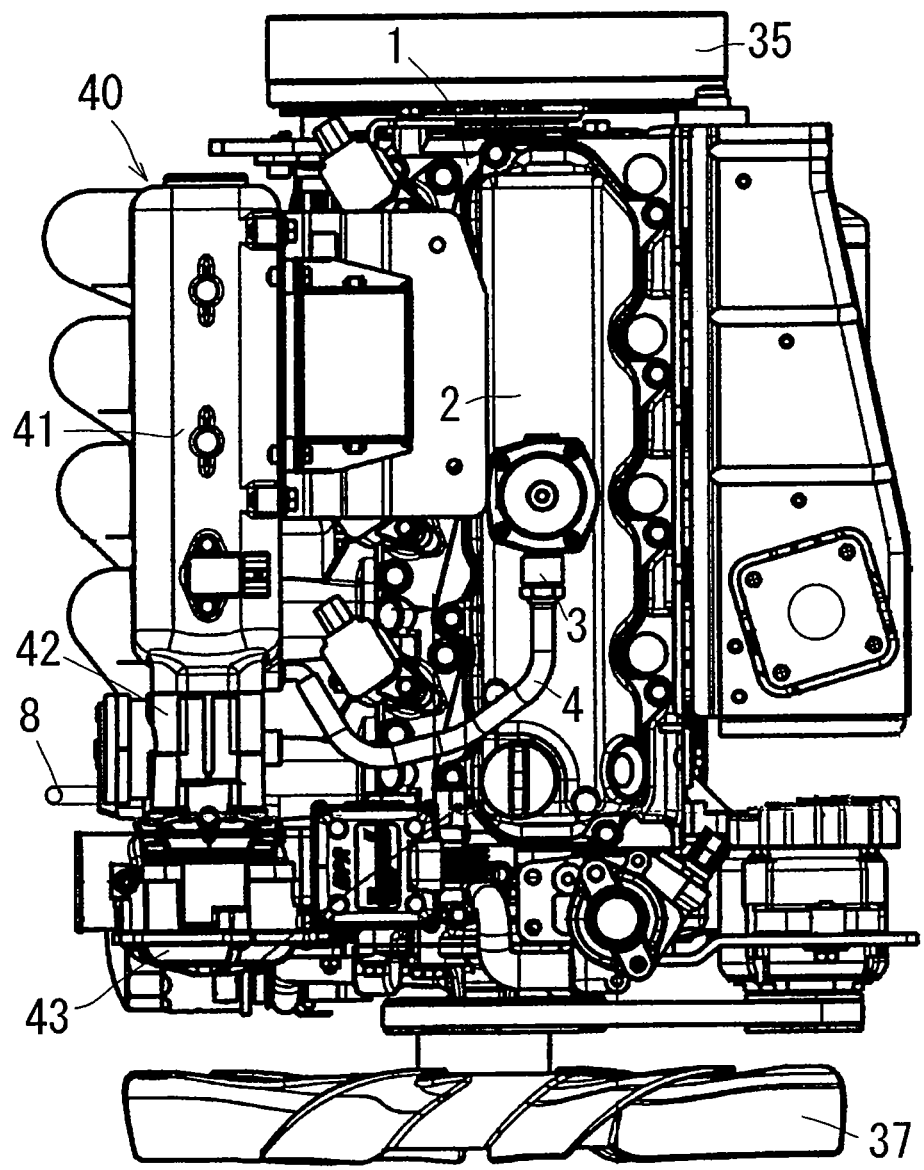
FIG. 6 is a plan view of the engine of FIG. 5.
Figure 7A:
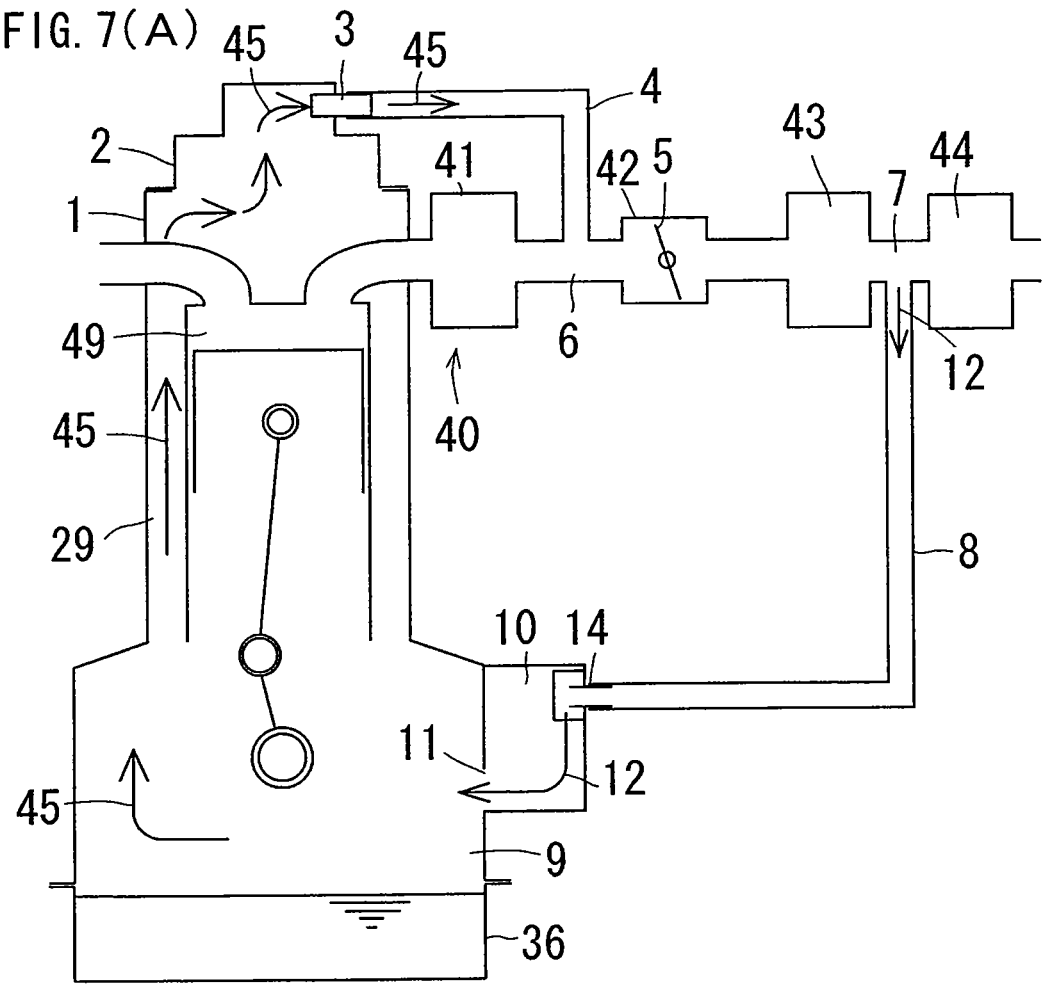
FIG. 7(A) is a diagram of an engine including a blow-by gas recirculating apparatus of a second embodiment of the invention.
Figure 7B:
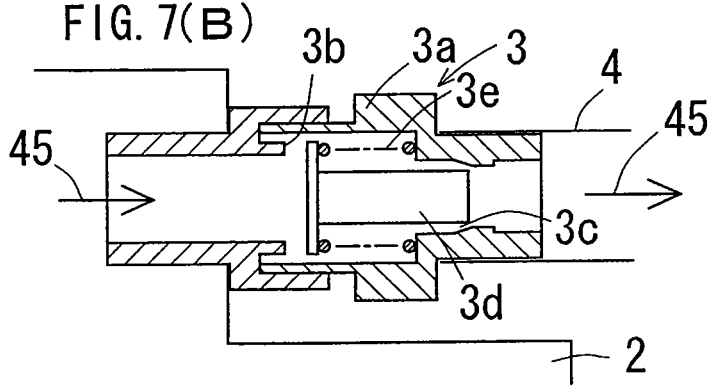
FIG. 7(B) is a view illustrating a PCV valve used in the apparatus.
Figure 8:
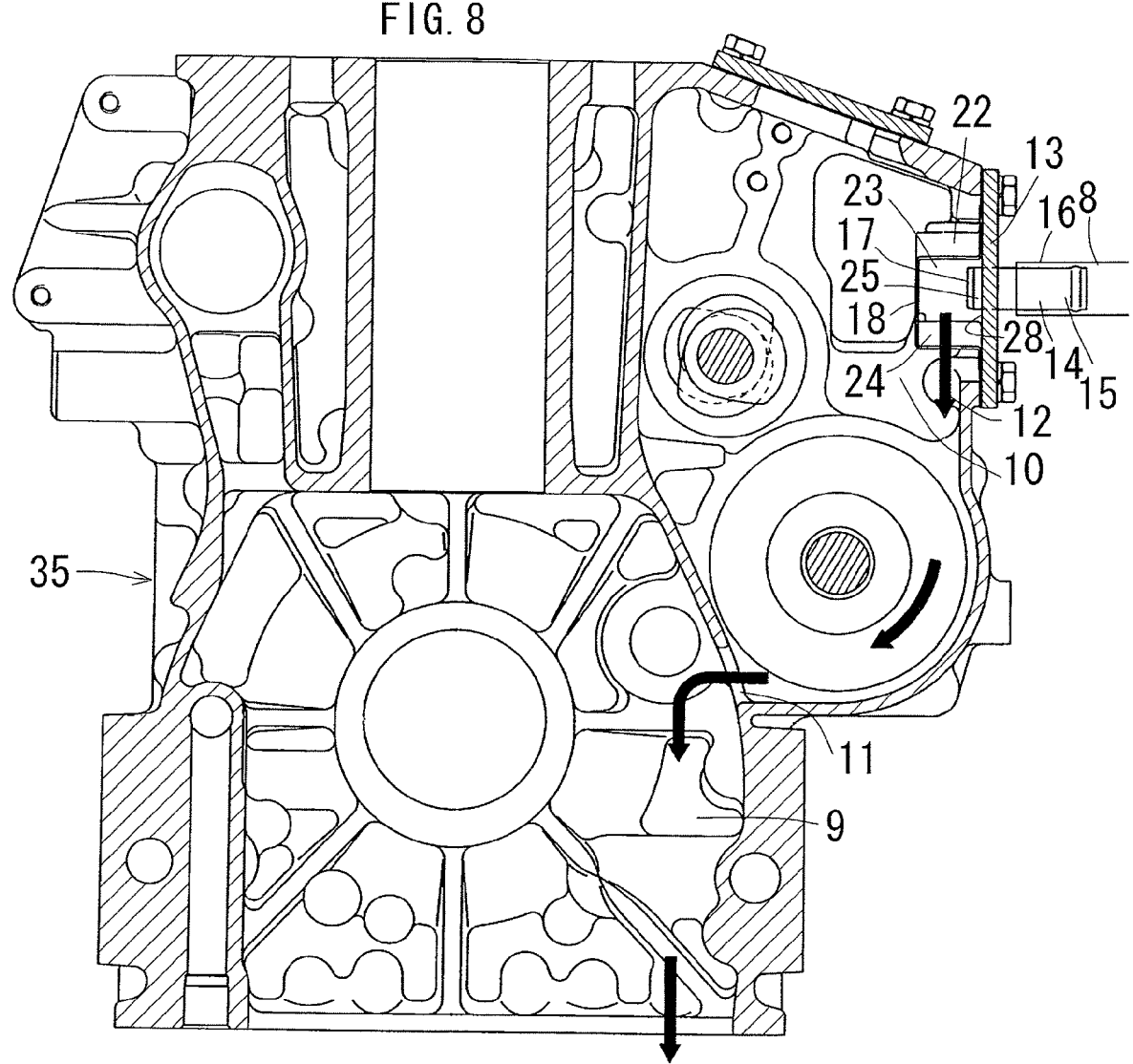
FIG. 8 is a longitudinal back sectional view of a cylinder block of the engine including the blow-by gas recirculating apparatus of the second embodiment of the invention.
Figure 9:
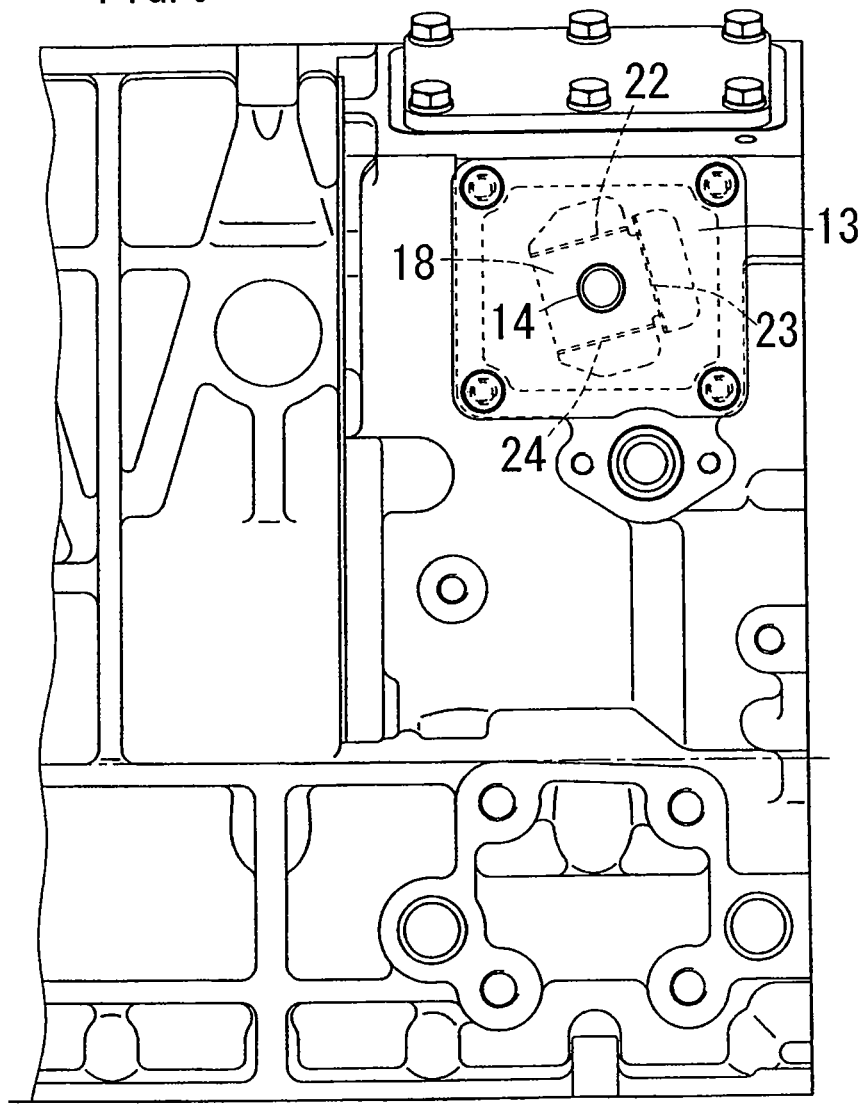
FIG. 9 is a side view of main portions of the cylinder block of FIG. 8.
Figure 11:
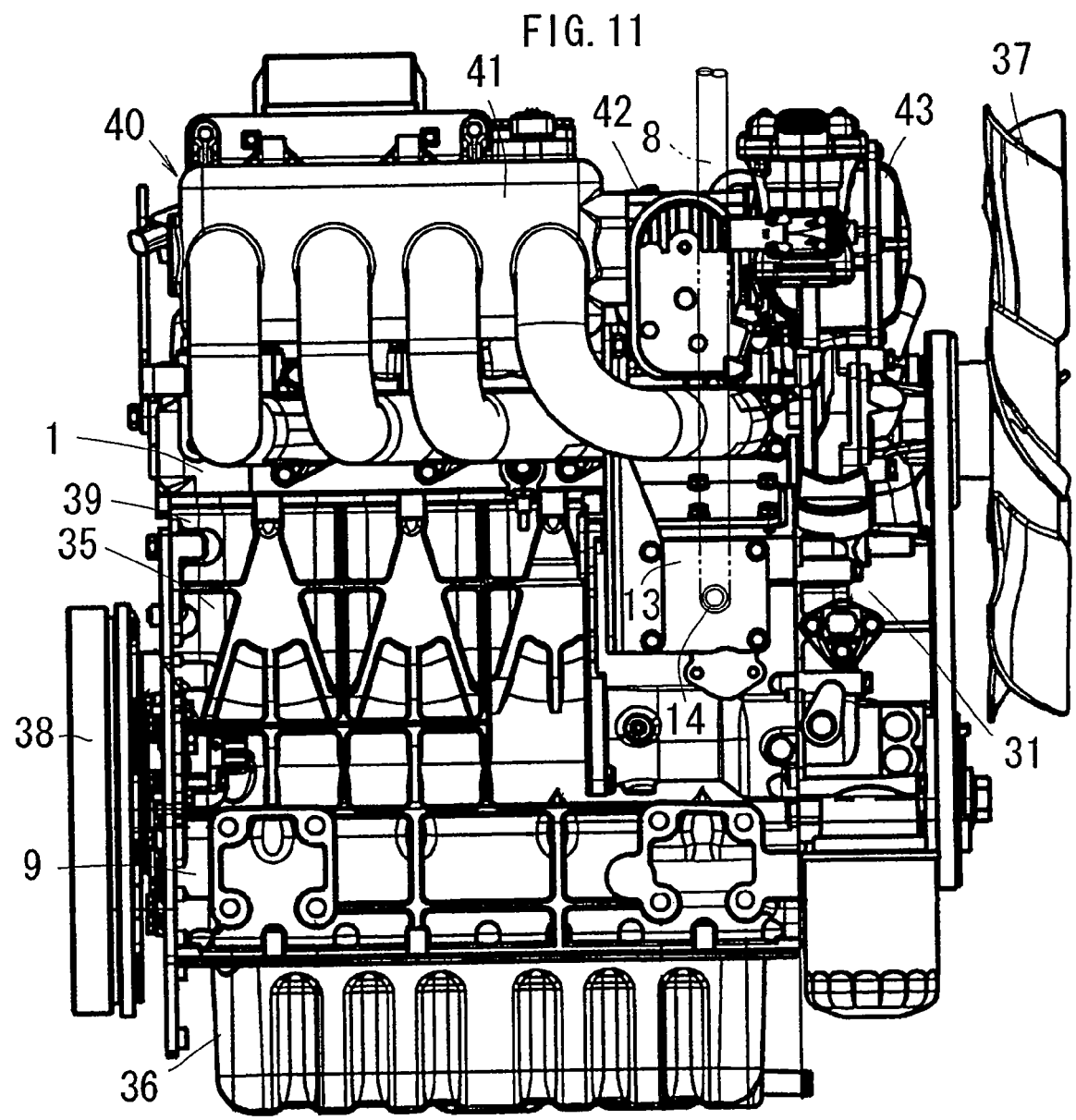
FIG. 11 is a side view of the engine including the blow-by gas recirculating apparatus of the second embodiment of the invention.
Figure 12:
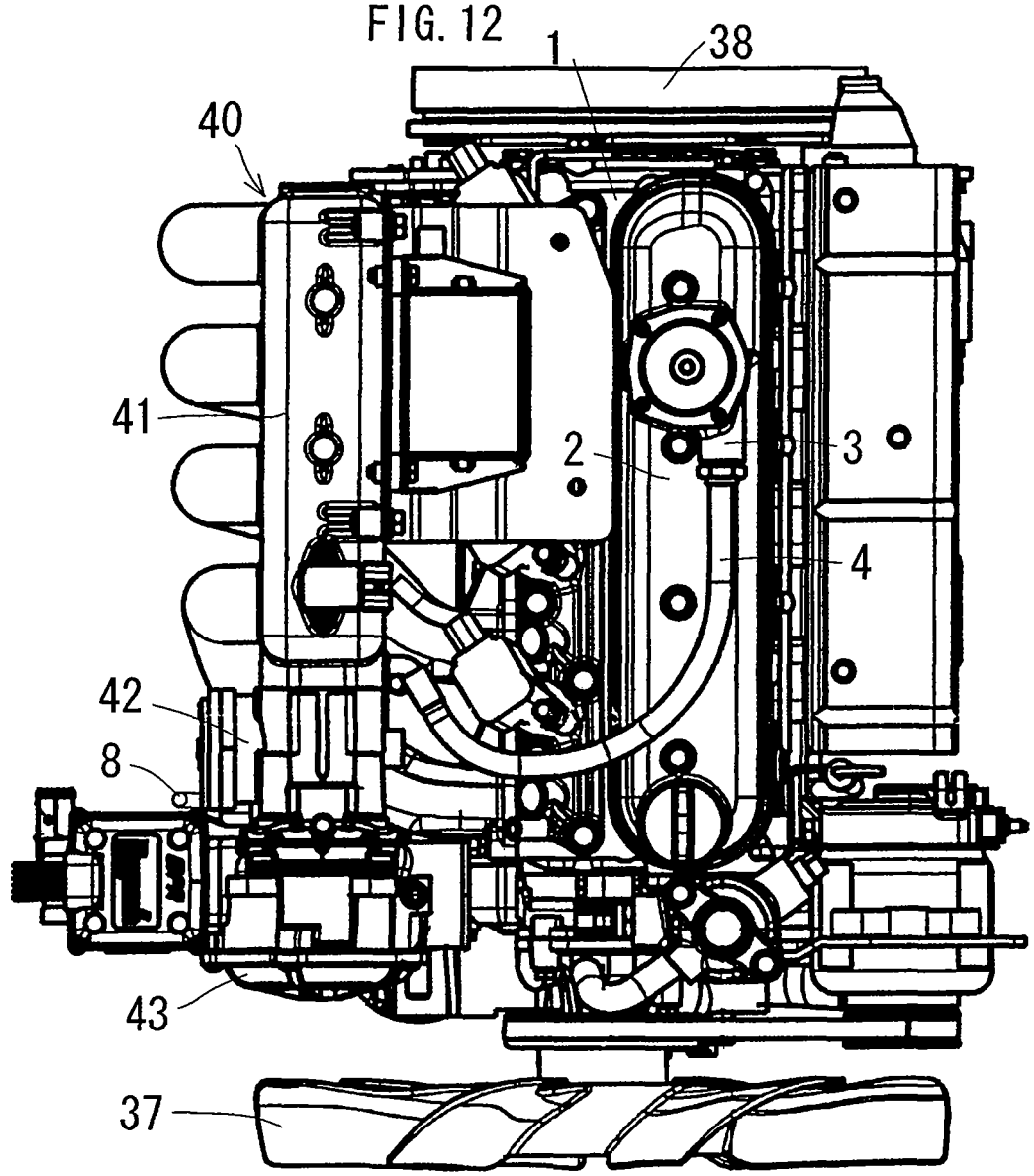
FIG. 12 is a plan view of the engine of FIG. 11.

In the engine, as shown in FIGS. 5 and 6, a cylinder head (1) is installed to an upper portion of a cylinder block (35), a head cover (2) is installed to an upper portion of the cylinder head (1), an oil pan (36) is installed to a lower portion of the cylinder block (35), and a transmission case (31) is installed to a front end portion of the cylinder block (35). An engine cooling fan (37) is placed in front of the transmission case (31), and a flywheel (38) is placed in rear of the cylinder block (35). The transmission case (31) is a gear case for a timing transmission gear train.

The upper half of the cylinder block (35) is a cylinder portion (39), and the lower half is a crankcase (9).

An intake manifold (40) is placed on one lateral side of the cylinder head (1), a throttle body (42) is attached to a front portion of a master pipe (41) of the intake manifold (40), and a gas mixer (43) is attached to a front portion of the throttle body (42). As shown in FIG. 1, an air cleaner (44) is communicated with the gas mixer (43).

Figure 1A:
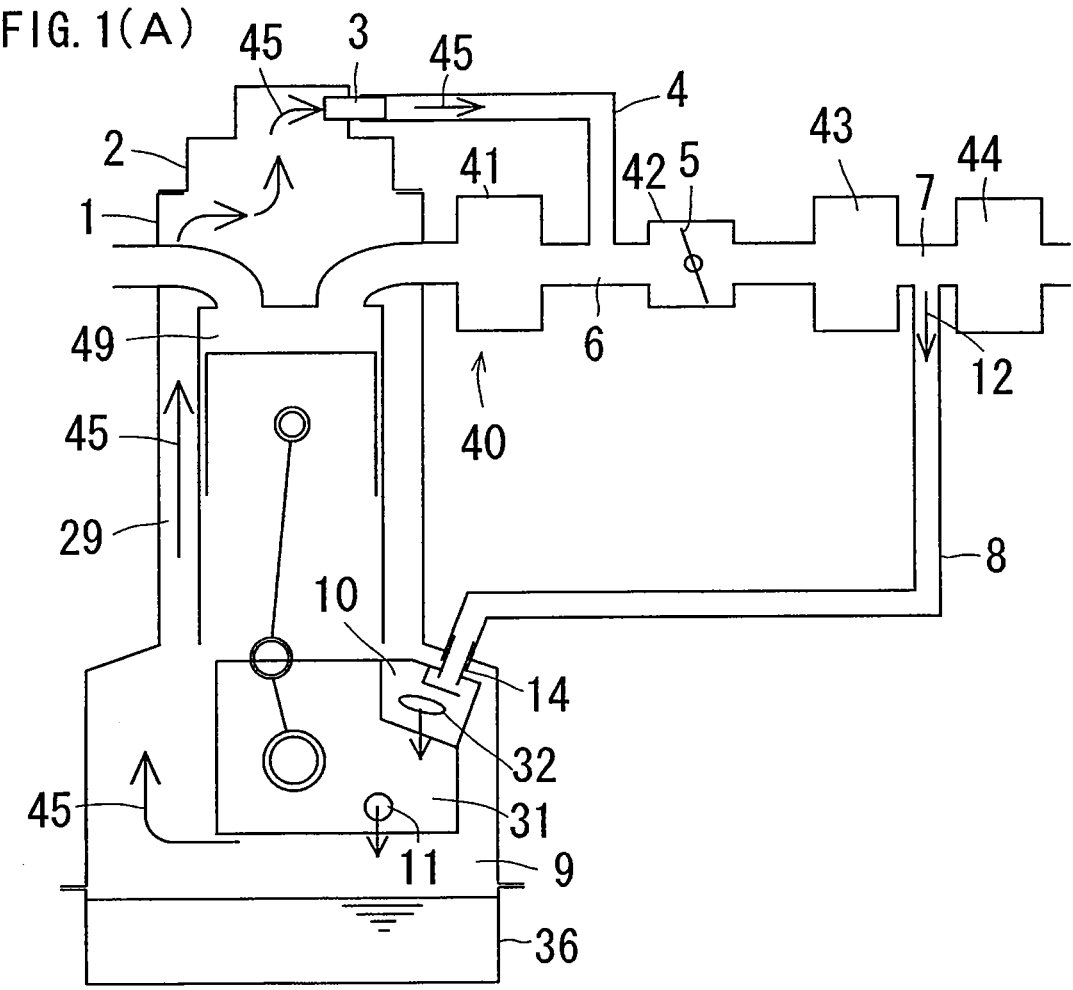
FIG. 1(A) is a diagram of an engine including a blow-by gas recirculating apparatus of a first embodiment of the invention.
Figure 1B:
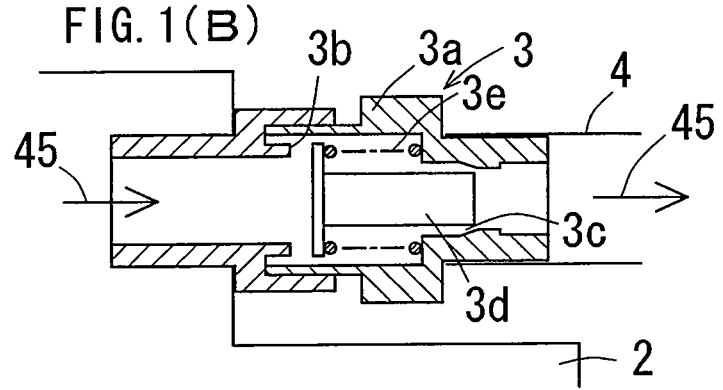
FIG. 1(B) is a view illustrating a PCV valve used in the apparatus.

As shown in FIGS. 1(A) and 1(B), a PCV valve (3) is attached to the head cover (2) attached to the cylinder head (1). The PCV valve (3) is communicated with a downstream intake passage (6) of a throttle valve (5) through a blow-by gas passage (4), and an upstream intake passage (7) of the throttle valve (5) is communicated with the crankcase (9) through a fresh air introducing passage (8). The upstream intake passage (7) is downstream of the air cleaner (44) and upstream of the gas mixer (43).

As shown in FIGS. 1(A) and 1(B), a fresh air introducing chamber (10) is disposed at a position which is remote from the head cover (2), the upstream intake passage (7) of the throttle valve (5) is communicated with the fresh air introducing chamber (10) through the fresh air introducing passage (8), and the fresh air introducing chamber (10) is communicated with the crankcase (9) through a crankcase communication throttle hole (11) which faces toward an interior of the crankcase (9).

According to the configuration, fresh air (12) in the upstream intake passage (7) of the throttle valve (5) is introduced into the crankcase (9) sequentially through the fresh air introducing passage (8), the fresh air introducing chamber (10), and the crankcase communication throttle hole (11), without being short-circuited to the PCV valve (3), and, in a reverse flow from the crankcase (9) to the upstream intake passage (7) of the throttle valve (5), a gas in the crankcase (9) reversely flows into the upstream intake passage (7) of the throttle valve (5) sequentially through the crankcase communication throttle hole (11), the fresh air introducing chamber (10), and the fresh air introducing passage (8).

In the PCV valve (3), as shown in FIG. 1(B), a valve seat (3b) is disposed on the upstream side of the interior of a valve case (3a), a valve passage (3c) is disposed on the downstream side of the valve case (3a), a valve element (3d) is reciprocally accommodated in the valve passage (3c), and the valve element (3d) is energized toward the valve seat (3b) by an energizing spring (3e).

In the PCV valve (3), the valve element (3d) is reciprocated by an unbalance force of the intake negative pressure of the downstream intake passage (6) of the throttle valve (5), the energizing force of the energizing spring (3e), and the internal pressure of the crankcase (9), to change the passage cross sectional area of the valve passage (3c) in the periphery of the valve element (3d) and that between the valve element (3d) and the valve seat (3b), thereby adjusting the flow amount of a blow-by gas (45) which is sucked from the crankcase (9) into the downstream intake passage (6) of the throttle valve (5).

During a light load time when the degree of opening of the throttle valve (5) is small, the intake negative pressure of the downstream intake passage (6) of the throttle valve (5) is high (near vacuum), the valve element (3d) is located in the downstream side of the valve passage (3c), and the passage cross sectional area of the valve passage (3c) in the periphery of the valve element (3d) is narrowed. Therefore, the flow amount of the blow-by gas (45) which is sucked from the crankcase (9) into the downstream intake passage (6) of the throttle valve (5) is small.

When the load is increased to a medium level and the degree of opening of the throttle valve (5) is made large by a governor mechanism (not shown), the intake negative pressure of the downstream intake passage (6) of the throttle valve (5) is low (near atmospheric pressure), the valve element (3d) is located in the upstream side of the valve passage (3c), and the passage cross sectional area of the valve passage (3c) in the periphery of the valve element (3d) is widened. Therefore, the flow amount of the blow-by gas (45) which is sucked from the crankcase (9) into the downstream intake passage (6) of the throttle valve (5) is increased as compared with the case of the low load.

When the load is increased to a high level and the degree of opening of the throttle valve (5) is changed to the vicinity of full open by the governor mechanism, the intake negative pressure of the downstream intake passage (6) of the throttle valve (5) is lower (near atmospheric pressure), the valve element (3d) is located in the further upstream side of the valve passage (3c), and the passage cross sectional area of the valve passage (3c) in the periphery of the valve element (3d) is widened. However, the valve element (3d) approaches the valve seat (3b), and the passage cross sectional area between the valve element (3d) and the valve seat (3b) is reduced. Therefore, the flow amount of the blow-by gas (45) which is sucked from the crankcase (9) into the downstream intake passage (6) of the throttle valve (5) is reduced as compared with the case of the medium load. In the high load, furthermore, the amount of the blow-by gas (45) which leaks from a combustion chamber (49) to the crankcase (9) is increased. In the high load, as described above, although the amount of the blow-by gas (45) which leaks to the crankcase (9) is increased, the flow amount of the blow-by gas (45) which is sucked from the crankcase (9) into the downstream intake passage (6) of the throttle valve (5) is reduced. Therefore, the gas in the crankcase (9) reversely flows into the upstream intake passage (7) of the throttle valve (5), and the internal pressure of the crankcase (9) is suppressed from rising.

As shown in FIGS. 2 to 4(B), a fresh air introducing pipe (14) is attached to a fresh air introducing chamber wall (13), a passage end portion (16) of the fresh air introducing passage (8) is connected to a pipe inlet portion (15) of the fresh air introducing pipe (14), and a pipe outlet opposed wall (18) is disposed in front of a pipe outlet (17) of the fresh air introducing pipe (14).

Figure 2:
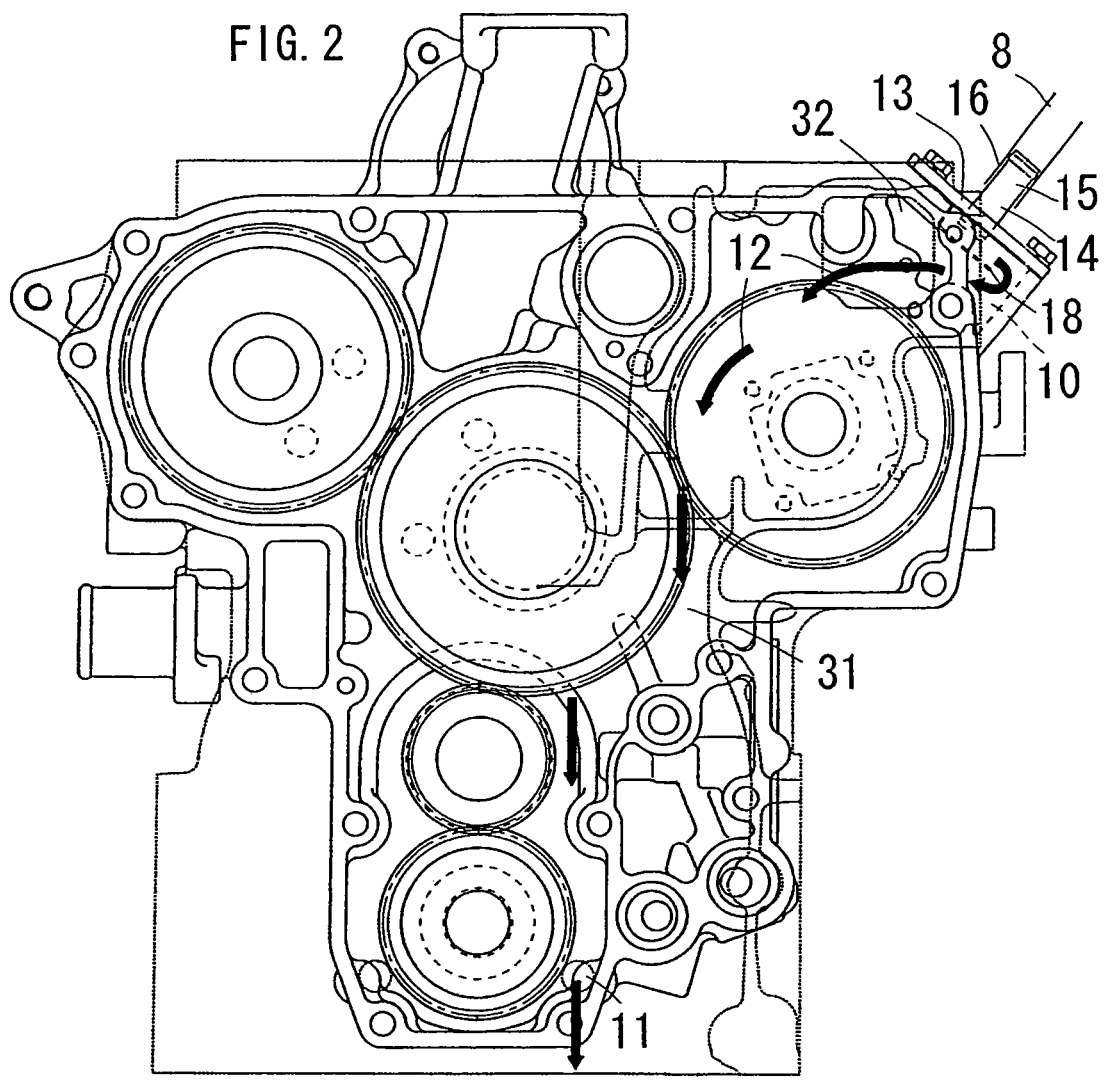
FIG. 2 is a back view of a transmission case of the engine including the blow-by gas recirculating apparatus of the first embodiment of the invention.

As shown in FIGS. 2 and 4(A), a pipe outlet portion (25) of the fresh air introducing pipe (14) is projected into the fresh air introducing chamber (10) with respect to an inner wall face (28) of the fresh air introducing chamber wall (13).

In the first embodiment, as shown in FIGS. 1(A) and 4(B), the transmission case (31) is attached to the crankcase (9), the fresh air introducing chamber (10) is disposed at a corner (31a) of the transmission case (31), such that a lateral end wall (10a) of the fresh air introducing chamber (10) is provided on a same lateral end side as a side where a lateral end wall (31b) of the transmission case (31) is placed. The fresh air introducing chamber (10) is communicated with the transmission case (31) through a transmission case communication throttle hole (32) which faces toward an interior of the transmission case (31), and the transmission case (31) is communicated with the crankcase (9) through the crankcase communication throttle hole (11) which faces toward the interior of the crankcase (9).

The transmission case (31) is attached to a front end portion of the crankcase (9).

According to the configuration, after passing through the fresh air introducing passage (8) and the fresh air introducing chamber (10), the fresh air (12) in the upstream intake passage (7) of the throttle valve (5) is introduced into the crankcase (9) sequentially through the transmission case communication throttle hole (32), the transmission case (31), and the crankcase communication throttle hole (11).

The interior of the crankcase (9) is ventilated with the fresh air (12), the blow-by gas (45) floats into the head cover (2) through a pushrod chamber (29), flows from the PCV valve (3) into the downstream intake passage (6) of the throttle valve (5) through the blow-by gas passage (4), and then is recirculated into the combustion chamber (49) to be subjected to reburning.

In the reverse flow from the crankcase (9) to the upstream intake passage (7) of the throttle valve (5), the gas in the crankcase (9) passes through the crankcase communication throttle hole (11), and further sequentially through the transmission case (31) and the transmission case communication throttle hole (32), and then reversely flows into the upstream intake passage (7) of the throttle valve (5) sequentially through the fresh air introducing chamber (10) and the fresh air introducing passage (8).

Figure 3:
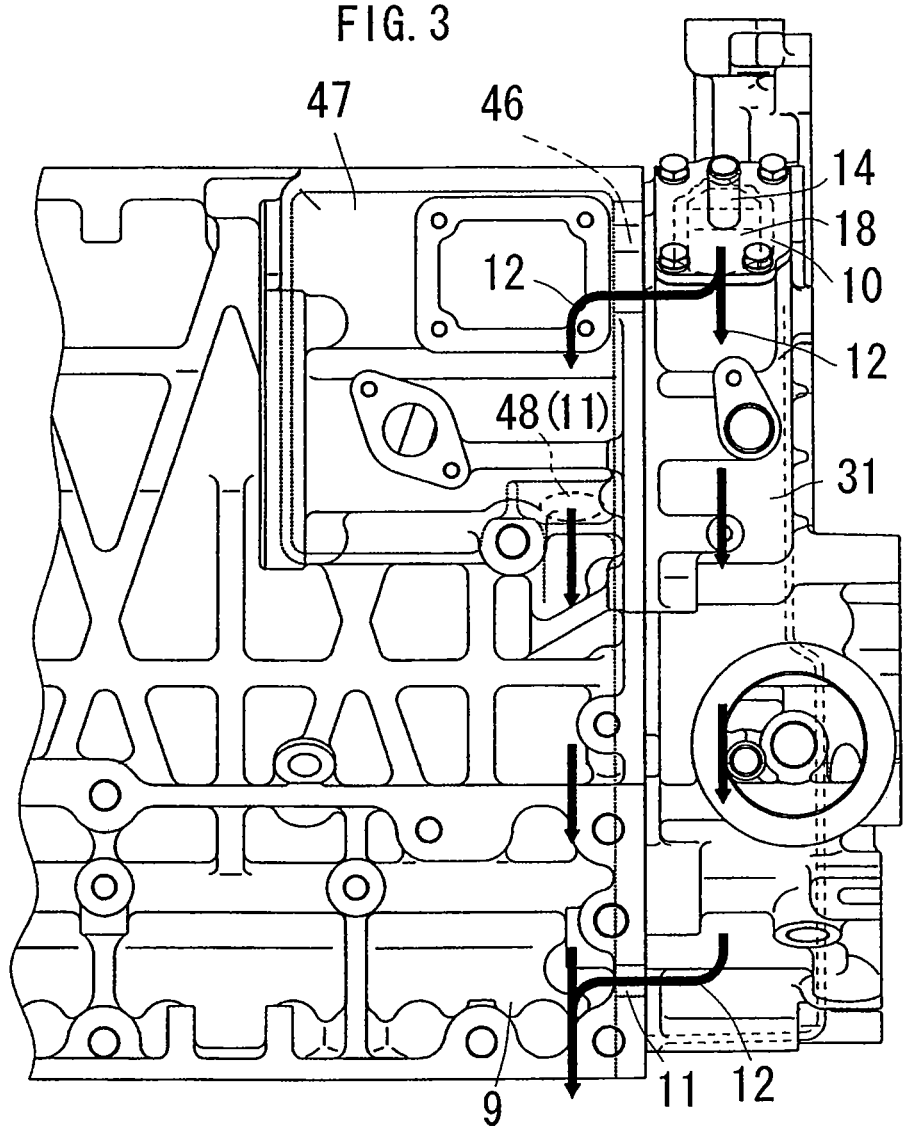
FIG. 3 is a side view of main portions of a cylinder block having a transmission case of the engine including the blow-by gas recirculating apparatus of the first embodiment of the invention.
Figure 4:
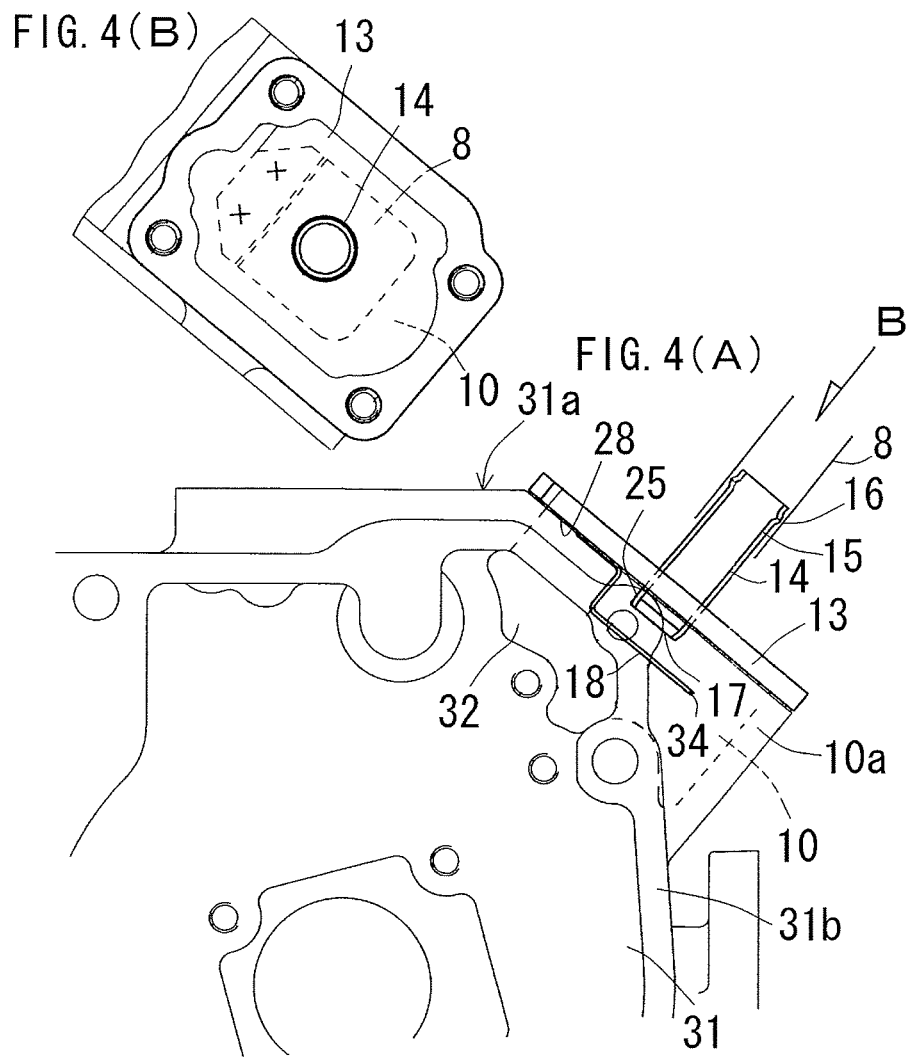
FIGS. 4(A) and 4(B) are views illustrating the transmission case of FIG. 2.

As shown in FIG. 3, the upper portion of the transmission case (31) is communicated with a second fresh air introducing chamber (47) through a second fresh air introducing chamber communication throttle hole (46), and the second fresh air introducing chamber (47) is communicated with the crankcase (9) through a second crankcase communication throttle hole (48). Through this route, therefore, part of the fresh air (12) introduced in the transmission case (31) is introduced into the crankcase (9).

As shown in FIG. 4(A), the pipe outlet opposed wall (18) is placed below the pipe outlet (17) of the fresh air introducing pipe (14), and the pipe outlet opposed wall (18) is downward inclined toward a lower end edge (34) of the wall, thereby causing the engine oil which flows over an upper face of the pipe outlet opposed wall (18), to flow down from the lower end edge (34) of the pipe outlet opposed wall (18) to a lower portion of the fresh air introducing chamber (10).

A second embodiment shown in FIGS. 7 to 12 is different from the first embodiment in the following points.

In the second embodiment, the fresh air introducing chamber (10) is disposed in adjacent to the crankcase (9).

According to the configuration, immediately after passing through the fresh air introducing passage (8) and the fresh air introducing chamber (10), the fresh air (12) in the upstream intake passage (7) of the throttle valve (5) is introduced into the crankcase (9) through the crankcase communication throttle hole (11).

In the reverse flow from the crankcase (9) to the upstream intake passage (7) of the throttle valve (5), the gas in the crankcase (9) reversely flows into the upstream intake passage (7) of the throttle valve (5) sequentially through the crankcase communication throttle hole (11), the fresh air introducing chamber (10), and the fresh air introducing passage (8).

As shown in FIGS. 8 to 10(E), pipe outlet portion surrounding walls (22), (23), (24) are bendingly formed from a peripheral edge portion of the pipe outlet opposed wall (18) toward the fresh air introducing chamber wall (13) to which the fresh air introducing pipe (14) is attached, three peripheral sides of the pipe outlet portion (25) are surrounded respectively by the pipe outlet portion surrounding walls (22), (23), (24), a communication port (26) is disposed in the remaining one peripheral side, and a surrounded space (27) surrounded by the pipe outlet opposed wall (18) and the pipe outlet portion surrounding walls (22), (23), (24) is communicated with the fresh air introducing chamber (10) in the outer side through the communication port (26).

As shown in FIGS. 8 to 10(E), the lower pipe outlet portion surrounding wall (24) is downward inclined toward the communication port (26), to cause the engine oil which flows over the upper face of the lower pipe outlet portion surrounding wall (24), to flow down from the communication port (26) to a lower portion of the fresh air introducing chamber (10).

FIGS. 10(D) and 10(E) show a modification of the pipe outlet opposed wall (18) and the pipe outlet portion surrounding walls (22), (23), (24) in the second embodiment. In the modification, the walls are not formed by bend shaping, but formed into a curved shape by a pressing process.

The other configuration is identical with that of the first embodiment, and, in the figures, the components which are identical with those of the first embodiment are denoted by the same reference numerals.

DESCRIPTION OF REFERENCE NUMERALS (1) cylinder head
(2) head cover
(3) PCV valve
(4) blow-by gas passage
(5) throttle valve
(6) downstream intake passage
(7) upstream intake passage
(8) fresh air introducing passage
(9) crankcase
(10) fresh air introducing chamber
(11) crankcase communication throttle hole
(12) fresh air
(13) fresh air introducing chamber wall
(14) fresh air introducing pipe
(15) pipe inlet portion
(16) passage end portion
(17) pipe outlet
(18) pipe outlet opposed wall
(22) upper pipe outlet portion surrounding wall
(23) front pipe outlet portion surrounding wall
(24) lower pipe outlet portion surrounding wall
(25) pipe outlet portion
(26) communication port
(27) surrounded space
(28) inner wall face of fresh air introducing chamber wall
(31) transmission case
(32) transmission case communication throttle hole
(34) lower end edge of pipe outlet opposed wall

What is claimed is:

1. A blow-by gas recirculating apparatus for a vertical engine having a cylinder block (35) and a transmission case (31) installed to a front end portion thereof, and in which a PCV valve (3) is attached to a head cover (2) attached to a cylinder head (1), said PCV valve (3) is communicated with a downstream intake passage (6) of a throttle valve (5) through a blow-by gas passage (4), and an upstream intake passage (7) of said throttle valve (5) is communicated with a crankcase (9) through a fresh air introducing passage (8), wherein:

a blow-by gas recirculating course including the PCV valve (3) and the blow-by gas passage (4) for recirculating blow-by gas (45) in the crankcase (9) to an intake passage is formed separately from a fresh air introducing course including the fresh air introducing passage (8), a fresh air introducing chamber (10) and a crankcase communication throttle hole (11) for introducing fresh air (12) in the intake passage directly from the fresh air introducing course into the crankcase (9), the fresh air introducing chamber (10), remote from said head cover (2) having the PCV valve (3) attached thereto, is disposed at a corner (31a) of the transmission case 31, the corner (31a) being located on a lateral end side of an upper portion of the transmission case (31), such that a lateral end wall (10a) of the fresh air introducing chamber (10) is provided on a same lateral end side as a side where a lateral end wall (31b) of the transmission case (31) is placed, and said upstream intake passage (7) of said throttle valve (5) is communicated with said fresh air introducing chamber (10) through said fresh air introducing passage (8), and said fresh air introducing chamber (10) is communicated with said crankcase (9) through the crankcase communication throttle hole (11) which faces toward an interior of said crankcase (9), a fresh air introducing chamber wall (13) is positioned atop the fresh air introducing chamber (10), being downward inclined toward the lateral end wall (10a) which is remote from a horizontal central portion of the transmission case (31), a fresh air introducing pipe (14) includes a pipe inlet portion (15) and a pipe outlet (17), said pipe inlet portion (15) being connected to a passage end portion (16) of said fresh air introducing passage (8), and said fresh air introducing pipe (14) being attached to the fresh air introducing chamber wall (13) adjacent the pipe outlet (17), and a pipe outlet opposed wall (18) is fastened to said fresh air introducing chamber wall (13), in a resting state, and disposed opposed to a front end of the pipe outlet (17) without other parts therebetween, being downward inclined toward the lateral end wall (10a) of the fresh air introducing chamber (10) below the pipe outlet (17) of the fresh air introducing pipe (14), thereby causing engine oil which flows over an upper face of said pipe outlet opposed wall (18), to flow down from a lower end edge (34) of the pipe outlet opposed wall (18) to a lower portion of said fresh air introducing chamber (10) through the lateral end wall (10a) side of the fresh air introducing chamber (10).

2. A blow-by gas recirculating apparatus for a vertical engine according to claim 1, wherein a pipe outlet portion (25) of said fresh air introducing pipe (14) is projected into said fresh air introducing chamber (10) with respect to an inner wall face (28) of said fresh air introducing chamber wall (13).

3. A blow-by gas recirculating apparatus for a vertical engine according to claim 1, wherein a transmission case (31) is attached to said crankcase (9), said fresh air introducing chamber (10) is disposed in adjacent to said transmission case (31), said fresh air introducing chamber (10) is communicated with said transmission case (31) through a transmission case communication throttle hole (32) which faces toward an interior of said transmission case (31), said transmission case (31) is communicated with said crankcase (9)

through said crankcase communication throttle hole (11) which faces toward said interior of said crankcase (9), after passing through said fresh air introducing passage (8) and said fresh air introducing chamber (10), the fresh air (12) in said upstream intake passage (7) of said throttle valve (5) is introduced into said crankcase (9) sequentially through said transmission case communication throttle hole (32), said transmission case (31), and said crankcase communication throttle hole (11), and, in the reverse flow from said crankcase (9) to said upstream intake passage (7) of said throttle valve (5), the gas in said crankcase (9) passes through said crankcase communication throttle hole (11), and further sequentially through said transmission case (31) and said transmission case communication throttle hole (32), and then reversely flows into said upstream intake passage (7) of said throttle valve (5) sequentially through said fresh air introducing chamber (10) and said fresh air introducing passage (8).

4. A blow-by gas recirculating apparatus for a vertical engine having a cylinder block (35) and a transmission case (31) installed to a front end portion thereof, and in which a PCV valve (3) is attached to a head cover (2) attached to a cylinder head (1), said PCV valve (3) is communicated with a downstream intake passage (6) of a throttle valve (5) through a blow-by gas passage (4), and an upstream intake passage (7) of said throttle valve (5) is communicated with a crankcase (9) through a fresh air introducing passage (8), wherein:

a blow-by gas recirculating course including the PCV valve (3) and the blow-by gas passage (4) for recirculating blow-by gas (45) in the crankcase (9) to an intake passage is formed separately from a fresh air introducing course including the fresh air introducing passage (8), a fresh air introducing chamber (10) and a crankcase communication throttle hole (11) for introducing fresh air (12) in the intake passage directly from the fresh air introducing course into the crankcase (9), the fresh air introducing chamber (10), remote from said head cover (2), is disposed at a side of the cylinder block (35), having the PCV valve (3) attached thereto, said upstream intake passage (7) of said throttle valve (5) is communicated with said fresh air introducing chamber (10) through said fresh air introducing passage (8), and said fresh air introducing chamber (10) is communicated with said crankcase (9) through the crankcase communication throttle hole (11) which faces toward an interior of said crankcase (9), a fresh air introducing chamber wall (13) is disposed on a lateral end side of the fresh air introducing chamber (10) across the fresh air introducing chamber (10) from the cylinder block (35), a fresh air introducing pipe (14) includes a pipe inlet portion (15) and pipe outlet portion (25) having a pipe outlet (17), said pipe inlet portion (15) being connected to a passage end portion (16) of said fresh air introducing passage (8), and said fresh air introducing pipe (14) being attached to the fresh air introducing chamber wall (13) adjacent the pipe outlet (17), and a pipe outlet opposed wall (18) is fastened to said fresh air introducing chamber wall (13), in a resting state, and disposed opposed to a front end of the pipe outlet (17) without other parts therebetween, a plurality of pipe outlet portion surrounding walls (22), (23), (24) are bendingly formed from a peripheral edge portion of said pipe outlet opposed wall (18) toward said fresh air introducing chamber wall (13), said pipe outlet portion surrounding walls (22), (23), (24) in a resting state being fastened to said fresh air introducing chamber wall (13) through said pipe outlet opposed wall (18), three peripheral sides of a pipe outlet portion (25) being surrounded respectively by said pipe outlet portion surrounding walls (22), (23), (24) in the resting state without other parts intervening therebetween, a communication port (26) disposed in a remaining one peripheral side, and a surrounded space (27) surrounded by said pipe outlet opposed wall (18) and said pipe outlet portion surrounding walls (22), (23), (24) in communication with said fresh air introducing chamber (10) in an outer side through said communication port (26)

said lower pipe outlet portion surrounding wall (24) being fastened to the fresh air introducing chamber wall (13) remote from the cylinder block (35), and downwardly inclined toward said communication port (26), thereby causing engine oil which flows over an upper face of said lower pipe outlet portion surrounding wall (24) to flow down from said communication port (26) to a lower portion of said fresh air introducing chamber (10).

5. A blow-by gas recirculating apparatus for a vertical engine according to claim 1, wherein said fresh air introducing course comprises the fresh air introducing passage (8), the fresh air introducing chamber (10), a transmission case communication throttle hole (32), a transmission case (31) and a crankcase communication throttle hole (11) whereby during operation of the engine, fresh air (12) in said upstream intake passage (7) of said throttle valve (5) is introduced into said crankcase (9) sequentially through said fresh air introducing passage (8), said fresh air introducing chamber (10), said transmission case communication throttle hole (32), said transmission case (31), and said crankcase communication throttle hole (11), without being short-circuited to said PCV valve (3), the blow-by gas (45) floats into the head cover (2), flows from the PCV valve (3) into the downstream intake passage (6) of the throttle valve (5) through the blow-by gas passage (4), and then is recirculated into a combustion chamber (49) to be subjected to reburning, and, in a reverse flow from said crankcase (9) to said upstream intake passage (7) of said throttle valve (5), a gas in said crankcase (9) reversely flows into said upstream intake passage (7) of said throttle valve (5) sequentially through said crankcase communication throttle hole (11), said transmission case (31), said transmission case communication throttle hole (32), said fresh air introducing chamber (10), and said fresh air introducing passage (8).

6. A blow-by gas recirculating apparatus for a vertical engine according to claim 1, further comprising an intake manifold (40) having a master pipe (41) oriented in the anteroposterior direction and a throttle body (42), wherein both said throttle body (42) and a passage outlet of the blow-by gas passage (4) are attached to an intake inlet portion located at a front end of the master pipe (41).

7. A blow-by gas recirculating apparatus for a vertical engine according to claim 4, wherein an extension direction of a crank shaft defines an anteroposterior direction, having a front side, and an opposing rear side, an intake manifold (40) including a master pipe (41) extending in the anteroposterior direction and having an intake inlet portion at a front end thereof, a throttle body (42) being attached to the intake inlet portion, and a passage outlet of the blow-by gas passage (4)

being connected to the intake inlet portion at the front end of the master pipe (41) of the intake manifold (40).

\* \* \* \* \*